July 14, 1931.  W. J. SUMMERBELL  1,814,500
GLARE SHIELD
Filed April 10, 1929

INVENTOR
W. J. SUMMERBELL
BY *Hazard and Miller*
ATTORNEYS

Patented July 14, 1931

1,814,500

UNITED STATES PATENT OFFICE

WILLIAM J. SUMMERBELL, OF LOS ANGELES, CALIFORNIA

GLARE SHIELD

Application filed April 10, 1929. Serial No. 354,158.

My invention is a glare shield for a vehicle, and has for an object the provision of a novel type of glare shield particularly adapted for use in conjunction with automobiles, as an assistance to the driver of such a vehicle in shielding his eyes from glaring light such as that emanating from the headlights of oncoming vehicles, or from the sun when it is close to the horizon.

A more detailed object is the provision of improvements in the manner of mounting a preferably transparent and colored glare shield, so that more complete and easier adjustment thereof, may be effected, with the result that the range of utility of the device is materially widened.

A more detailed object is the provision of a glare shield of the general character described, which is adjustably mounted upon a track extending along the front wall of the vehicle, preferably over the windshield, and curved to position a portion of the track, so that it extends along either one or both of the side walls, with the result that the glare shield may be positioned at the will of the operator, either directly in front of himself, in which position it serves to protect his eyes against the glare from oncoming headlights, or at his side when an objectionably glaring light is directing its rays toward the driver, from a side of his vehicle.

A further object is the provision of a glare shield as described, which is adjustable not only laterally of the vehicle by sliding it upon the track, but which is also adjustable vertically in respect to the track, and pivotally about a horizontal axis, so that the shield may be adjusted to any desired degree of angularity with the vertical.

A still further object is the provision of novel means for releasably and securely clamping the shield in selected position.

A still further object is the provision of a glare shield of the general class described, which is optionally positionable in or out of registration with the rear vision mirror of the vehicle, so that if the operator desires, he may protect his eyes against the glare from the headlights of a vehicle in the rear of his own vehicle, and the light from the headlights of which is reflected into the driver's eyes by the rear vision mirror.

The invention possesses other objects and advantageous features, some of which, with those enumerated, will be set forth in the following description of the invention's particular embodiment which is illustrated in the drawings accompanying and forming a part of the specification.

Referring to the drawings.

Figures 1, 2:
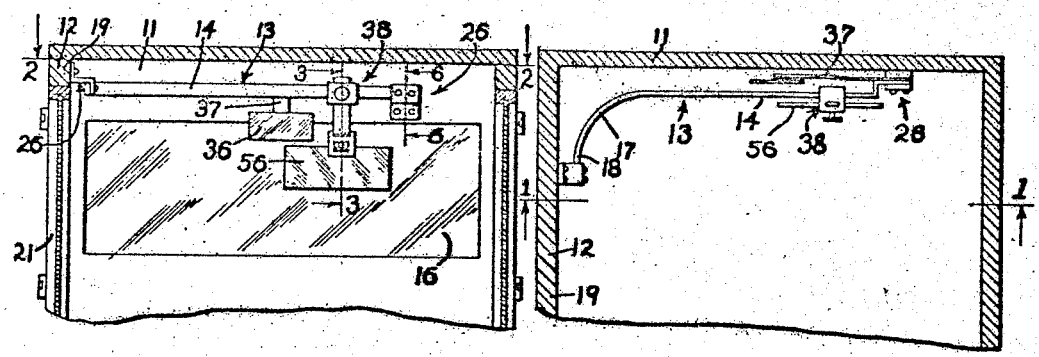
Figure 1 is a vertical, transverse sectional view taken through the upper portion of the body of an automobile such as a sedan, and showing the glare shield of my invention and its mounting, in elevation. The plane of section is indicated by the line 1—1 of Fig. 2, with the direction of view as indicated.
Fig. 2 is a horizontal sectional view of the forward end of the vehicle, the plane of section being indicated by the line 2—2 of Fig. 1, with the direction of view as indicated.

Specifically describing the invention in the most practical embodiment thereof, of which I am at present aware, it is herein shown and described as being mounted upon the forward wall 11, and side wall 12, of a vehicle such as a closed automobile. The track 13 which carries the glare shield, comprises a straight portion 14 secured to the front wall 11 above the windshield 16 of the vehicle, a curved portion 17, and preferably a short straight portion 18 secured to the lintel 19 of the side wall 12, above the door 21. While the track is herein shown and described as being extended along only the left hand or driver's side of the vehicle, it should be understood that I contemplate the employment of a track in which both ends are extended, so that the track will curve at each of the forward corners of the vehicle, and extend for some distance along each of the side walls.

The track 13 is mounted in operative position in any convenient manner such as a plurality of brackets 26. Each bracket is rigidly attached to a wall of the vehicle, as by a screw 27, and is provided with a horizontal portion 28 supporting an attaching portion 29 spaced from the wall to which the bracket is secured. The track 13 is attached to this portion 29, in any convenient manner such as by a bolt 31 passing through the portion 29 and through the track 13, to have a nut 32 and a lock washer 33 disposed thereupon, upon the opposite side of the track. The bracket 26, by means of which the track 13 is secured to the forward wall, also serves as a convenient support for the rear vision mirror 36. With this object in view, an additional bar 37 is secured behind the track 13, by means of the bolt 31, this bar extending from the bracket 26 to a position adjacent the center of the windshield, and downwards, so as to position the rear vision mirror properly for the driver to gain the best view through the rear window of the vehicle.

Figure 3:
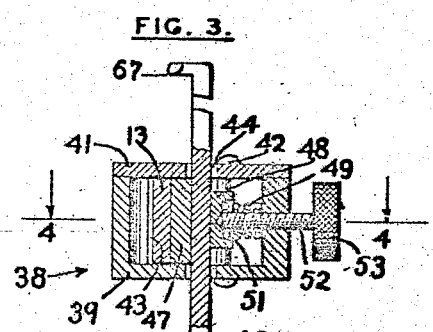
Fig. 3 is an enlarged, vertical sectional view of the glare shield and its mounting, the plane of section being taken upon the line 3—3 of Fig. 1, with the direction of view as indicated. Portions of the figure are broken away to reduce its length.
Figure 6:
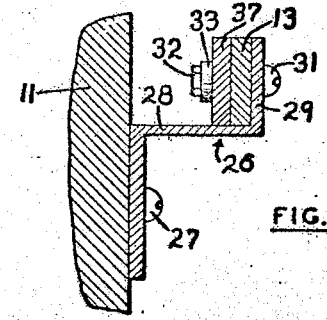
Fig. 6 is a vertical sectional view of one of the brackets for attaching the track to the vehicle. The plane of section is taken upon the line 6—6 of Fig. 1, and the direction of view is indicated by the arrows.
Figure 5:
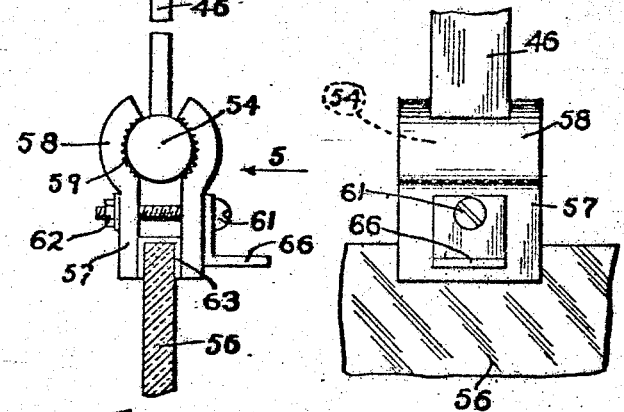
Fig. 5 is an elevation showing the clamp, by means of which the glare shield is attached to its supporting bar. The direction of view is indicated by the arrow 5 of Fig. 3.
Figure 4:
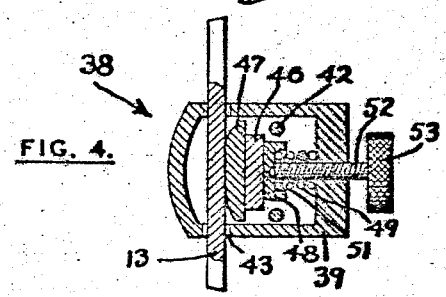
Fig. 4 is a horizontal sectional view taken upon the line 4—4 of Fig. 3, with the direction of view as indicated.

A head indicated in its entirety at 38, is slidably mounted upon the track 13. This head comprises a hollow body portion 39, and a cover 41 rigidly attached together as by rivets 42 or their equivalent. The sides of the body 39 are provided with opposed apertures 43, through which the track 13 extends, whereas the bottom of the body 39, and the top 41, are provided with opposed apertures 44 through which a supporting bar 46 slidably extends. Both the apertures 43 and 44 are slightly larger than the track, or bar 46 respectively, extending therethrough so that lateral play of the bar in respect to the head, and of the head in respect to the track, is permitted. Furthermore, the apertures 43 and 44 are spaced in respect to the major axis of the body 39, a distance sufficient to accommodate a preferably bronze shoe 47, between the bar 46 and track 13, inside the head 39. Another preferably bronze shoe 48 is resiliently pressed against the other side of the bar 46, by a spring 49 which is under compression between the associated end of the body 39 and this second shoe, which is provided with a socket 51 within which the associated end of the spring 49 is seated. In addition, a clamping screw 52 having a knurled head 53, is threaded through this same end of the body 39, and extends axially through the spring 49, to engage the shoe 48, as clearly shown upon Figs. 3 and 4.

The bar 46 extends vertically downwards from the track 13, and carries at its lower end, a horizontally disposed cylindrical barrel 54. A preferably transparent and colored glare shield 56 is attached to the bar 46, by means of a pair of opposed clamps 57, the upper ends 58 of which are arcuate, and which are provided with serrations 59 on their inner faces, to assist in their being clamped upon the barrel 54, which is accomplished by means of a bolt 61 extending through both clamps to receive a nut 62. A cushion 63, such as a sheet of rubber, is interposed between the clamps 57 and the glare shield 56, to protect the latter against fracture, inasmuch as it is preferably to be composed of non-shatterable glass.

In actual practice, I have found that the most desirable color for the shield 56, is amber, in that when so colored, the shield serves to absorb the most blinding constituent rays of white light.

Angular adjustment of the shield 56 about the horizontal axis of the barrel 54, is facilitated by the presence of a handle 66, held in place by the bolt 61. Also, downward movement of the bar 46, is limited by a tongue 67 extending angularly from the upper end of the bar 46.

The device is operated by moving the shield 56 into that position into which it will afford the best protection to the eyes of the operator. For example, when the operator's vision is impaired by the glare of the headlights of a vehicle approaching from the opposite direction, the shield 56 may easily be interposed between the operator's eyes and the said headlights, by sliding the head 38 upon the track to effect horizontal adjustment, and by sliding the bar 46 within the head 38, to effect vertical adjustment, it being understood of course, that the locking screw 52 has first been loosened. If frequent adjustments are contemplated, the locking screw 52 may be left loosened, in which event the spring 49 will impose sufficient pressure of the shoe 48, upon the bar 46, and of the bar 46 upon the track 13, through the shoe 47, to hold the parts against inadvertent displacement. However, secure locking of the parts may be effected by again tightening the locking screw 52.

It frequently occurs that the driver of an automobile is bothered by having the rays from the rising or setting sun, shine into his eyes. Of course, the shield 56 may be employed to protect the driver against this light also; and if the source of light bothering the driver, is disposed upon one side of the vehicle, the head 38 may be moved along the track 13 around the curved portion 17, to bring the shield 56 into that position into which its shadows will fall upon the driver's eyes. If it be desired to alter the angularity of the shield 56 in respect to the vertical, this may easily be effected by swinging the shield 56 and clamps 57, about the barrel 54, it being understood that the nut 62 is tightened upon the bolt 61, only to such an extent that movement of the clamps 57 in respect to the barrel 54, is possible.

It is to be understood that the details of the invention as herein disclosed, are subject to alteration within the spirit or scope of the appended claims.

I claim:

A glare shield for a vehicle having a front window and a side window, comprising a track curved intermediate its ends, brackets adapted to be secured to said vehicle and to support said track over both of said windows, a head embracing said track and adapted to be slid thereon to a position over either of said windows, a bar extending slidably through said head angularly with respect to said track, a spring interposed between said head and said bar and pressing said bar against said track to increase the friction therebetween, a set screw threaded through said head and adapted to press said bar against said track to lock both the head and the bar in selected position with respect to said track, and a shield mounted upon said bar.

In testimony whereof I have signed my name to this specification.

WM. J. SUMMERBELL.